United States Patent [19]

Braun

[11] 4,141,952
[45] Feb. 27, 1979

[54] METHOD OF MOLDING INSULATING DISKS ON COAXIAL-CABLE WIRE

[75] Inventor: Dieter Braun, Schildgen, Fed. Rep. of Germany

[73] Assignee: Felten & Guilleaume Carlswerk AG, Köln-Mülheim, Fed. Rep. of Germany

[21] Appl. No.: 785,358

[22] Filed: Apr. 7, 1977

[30] Foreign Application Priority Data

Apr. 7, 1976 [DE] Fed. Rep. of Germany ....... 2614937

[51] Int. Cl.² .......................... B29C 5/00; B29D 3/00; B29F 1/00
[52] U.S. Cl. .................................. 264/251; 264/40.1; 264/254; 264/271; 264/328
[58] Field of Search ............... 264/161, 251, 259, 328, 264/329, 271, 279, 334, 265, 254, 255, 40.1; 425/123, 308, 134, 223, 224, 336, 246, 251, 259, DIG. 34, 117, 122, 123, 225, 230, 231, 129 R, 575, 814

[56] References Cited

U.S. PATENT DOCUMENTS

| | | | |
|---|---|---|---|
| 2,197,968 | 4/1940 | Demattia | 425/121 |
| 2,297,070 | 9/1942 | Poux | 425/122 |
| 2,465,656 | 3/1949 | Morin | 264/251 |
| 2,497,951 | 2/1950 | Low | 425/121 |
| 2,511,402 | 6/1950 | Firing | 425/121 |
| 2,516,789 | 7/1950 | Montoriol et al. | 264/328 |
| 2,569,083 | 9/1951 | Wilhelm | 264/328 |
| 2,865,795 | 12/1958 | Morrison | 264/174 |
| 3,443,374 | 5/1969 | Carnevale | 264/174 |
| 3,445,915 | 5/1969 | Cuckson et al. | 425/545 |
| 3,454,984 | 7/1969 | Alberts | 425/129 |
| 3,826,690 | 7/1974 | Bleinberger et al. | 264/265 |
| 3,888,616 | 6/1975 | Ulmschneider et al. | 425/575 |
| 3,889,448 | 6/1975 | Russell | 425/575 |
| 3,918,864 | 11/1975 | Braun | 425/129 R |

FOREIGN PATENT DOCUMENTS

1006605 4/1952 France ..................................... 264/251

OTHER PUBLICATIONS

Randolph et al.; Plastics Engineering Handbook, Reinhold, N.Y. (1960), pp. ii, 47 and 48.

*Primary Examiner*—W. E. Hoag
*Attorney, Agent, or Firm*—Michael J. Striker

[57] ABSTRACT

A plurality of mold pairs together forming an array having an outer surface and each having a mold cavity and an inlet between a respective cavity and the surface is continuously rotated past the end of a generally stationary nozzle so as sequentially to align the inlets with the nozzle end. A plastified and hardenable resin is continuously fed under pressure to the nozzle end which is spaced from the surface of the mold array by a predetermined constant distance. Thus resin material continuously exits from the nozzle. When the nozzle is aligned with an inlet opening this material enters the inlet opening and forms a body therein and a sprue integral with the body. When the end is not aligned with the inlet the material escapes laterally from between the end and the surface and forms on the surface a generally continuous film unitary with the sprues. The mold pairs are sequentially opened and closed on successive spaced-apart locations of a wire before and after the molding thereon of the bodies. The sprues and the film are separated from the wire after such molding and replastified for reuse.

10 Claims, 3 Drawing Figures

METHOD OF MOLDING INSULATING DISKS ON COAXIAL-CABLE WIRE

BACKGROUND OF THE INVENTION

The present invention relates to a method of molding a succession of discrete bodies on an elongated flexible element. More particularly this invention concerns the formation of a succession of insulating disks on a wire intended to serve as the inner conductor in a coaxial cable.

A coaxial cable is known having an outer solid or braided conductor of tubular shape which is normally grounded. Received coaxially within this tubular outer conductor is an inner conductor that is frequently spaced radially inwardly of the outer conductor by means of a succession of synthetic-resin insulating disks molded on the inner conductor. This air-insulated type of coaxial cable is used for example in long distance communication systems or the like.

Methods are known for making such an inner conductor. In my British Pat. No. 1,406,100 as well as my U.S. Pat. No. 3,918,864 there is disclosed a method and apparatus using a plurality of mold pairs together forming an array having a cylindrical outer surface. Each of these mold pairs has a mold cavity and an inlet passage extending between the respective cavity and a pressurized source of plastified and hardenable resin material. A valve is provided in each of these inlet passages. The wire constituting the elongated flexible element on which is to be molded a succession of discrete bodies is fed to this array of mold pairs which are sequentially closed on successive spaced-apart portions of the flexible element. The array is rotated about a central axis and as soon as each of the mold pairs has closed on the wire the respective valve is temporarily opened so as to fill this mold cavity with the synthetic resin being employed to form the insulating bodies or disks. Thereafter the valve is closed and the respective body formed in the cavity and sprue formed in the inlet passage unitary with the body harden. Thereafter the respective mold pair is opened and the conductor carrying the body and sprue is pulled from the array of mold pairs.

Such an arrangement produces an extremely high-quality product and can operate at a high rate of speed. It, however, has the considerable disadvantage that the equipment needed is very complex and quite expensive. This complexity further leads to periodic failure so that it is necessary to shut the machine down and service it frequently.

Another arrangement is known from French Pat. No. 1,006,605. In this system there is, once again, a cylindrically annular array of mold pairs. Here the device is coupled with a stationary extruder head that is pressed radially against the cylindrical outer surface of the array. The inlet passages extend radially outwardly from the mold cavities to the outer surface. Thus the array of mold pairs is rotated past the extruder head so as to sequentially align the mold-cavity inlets with the extruder head pressed against the outer surface. As each inlet is aligned with the mold head the plastified material continuously under pressure inside the head enters the mold cavity through the inlet.

This system simple as it appears to be at first sight, however, has the considerable disadvantage that there is periodically some leakage between the complementarily shaped surfaces of the nozzle and mold array, so that plastified material can escape and form lumps on the mold array. This leakage is most common at the regions between adjacent mold pairs. Furthermore the material forced under pressure into each of the mold cavities tends to push back out to a limited extent after each of these cavities passes the nozzle, thereby again frequently forming a lump on the surface of the mold array.

An attempt has been made to overcome this disadvantage by extremely finely machining the mold pairs and extruder head, and by urging the extruder head with great force against the mold array. Such a fine machining again greatly increases the cost of the installation. Furthermore the considerable radial pressure exerted by the extruder on the mold array causes considerable wear at the interface between these two elements, and greatly loads the bearing for the mold array. Thus equipment cost is again elevated and the device must be frequently shut down in order to service it and replace some part.

SUMMARY OF THE INVENTION

It is therefore an object of the present invention to provide an improved method of molding a succession of discrete bodies on an elongated flexible element.

More particularly an object of this invention is to provide an improved method of making an inner conductor having a succession of spaced-apart insulating disks for a coaxial cable.

Yet another object is to provide such a method which can operate at high speeds and yet which does not have the above-mentioned disadvantages.

These objects are attained according to the present invention in an arrangement wherein an array of mold pairs as described above with reference to French Pat. No. 1,006,605 is used in conjunction with a stationary nozzle. According to this invention, however, the end of the nozzle is spaced from the outer surface of the mold array by a predetermined distance during relative displacement of the nozzle and the mold pairs. Thus when the nozzle end aligns with a mold-cavity inlet it injects resin material through the inlet into the respective cavity and forms therein a body and a sprue integral with the body. Furthermore when the end is not aligned with the inlet the material escapes laterally from between the nozzle end and the surface and forms on the surface of the mold array a generally continuous film which is unitary with the previously formed sprues. After opening of the mold pairs the sprues and the film are separated from the bodies formed on the flexible element.

This method has not only the considerable advantage that equipment costs are relatively low but moreover that it can operate at relatively high speed since the wear between the nozzle end and the outer surface is completely eliminated, as in the region where these two elements are juxtaposed they are separated by a layer of relatively soft plastified material. This film, furthermore, hardens rather rapidly so that it prevents a further escape of resin material from between the nozzle and the outer surface of the mold array.

According to another feature of this invention the spacing is established by holding the nozzle towards the mold array with a predetermined force that is slightly smaller than the reaction force which the resin mass exerts in the opposite direction forcing the mold array and nozzle apart. This reaction force is determined by the injection pressure adjusted in accordance with the allotted filling time, the composition and temperature of the resin material being employed and the volume of the mould cavities to be filled, together giving it a certain viscosity, as well as the desired spacing between the two surfaces. The filling time depends on optimal speed at which the mould-inlets are subsequently passed in front of the nozzle and, choosen in accordance with the previously mentioned conditions such that the time required for the injected material to solidify is shorter than the recicling time of each mould. Such an arrangement allows an extremely fine adjustment of the film thickness so that it can be stripped cleanly off the mold array after it hardens, thereby greatly facilitating demolding of the element formed with the conductor disks, and allowing the production speed to be kept as high as possible.

According to further features of this invention the sprues and film are separated from the bodies and replastified for use again as the resin material used for molding the bodies, sprues, and film at a later time. When a thermoplastic resin such as polyethylene is employed thermal decomposition need hardly be taken into account so that very little waste will occur. Thus the resin employed to form the film and sprues is not actually wasted.

According to yet another feature of this invention the segmental halves forming the mold pairs are pushed together with a predetermined force that is increased during the injecting operation. Furthermore after the injecting operation and before the mold pairs are opened the mold pairs are cooled so as to minimize hardening time and increase production rate. As the clamping pressure is thus increased, according to an important feature of this invention the nozzle is drawn with a carefully regulated force towards the mold pair in question.

According to further features of this invention the flexible element is a wire and withdrawn, e.g., from an overhead supply. The wire is then calibrated and cleaned with a solvent solution. Thereafter the cleaned element is fed at a predetermined speed equal to the orbiting or displacement speed of the mold cavity to the mold pairs and is thereafter withdrawn from the mold pairs at the same speed. The mold pairs together form an annular wire-receiving passage that passes through all of the mold cavities and is dimensioned to snugly receive the wire. Thus the mold itself serves to entrain the wire as the bodies are molded therearound. With such an arrangement it is possible to operate continuously, especially if two separate supplies of wire are employed, so that as the one runs out another wire can be immediately fed through the system, insuring continuous production.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

DESCRIPTION OF A PREFERRED EMBODIMENT

Figure 1:
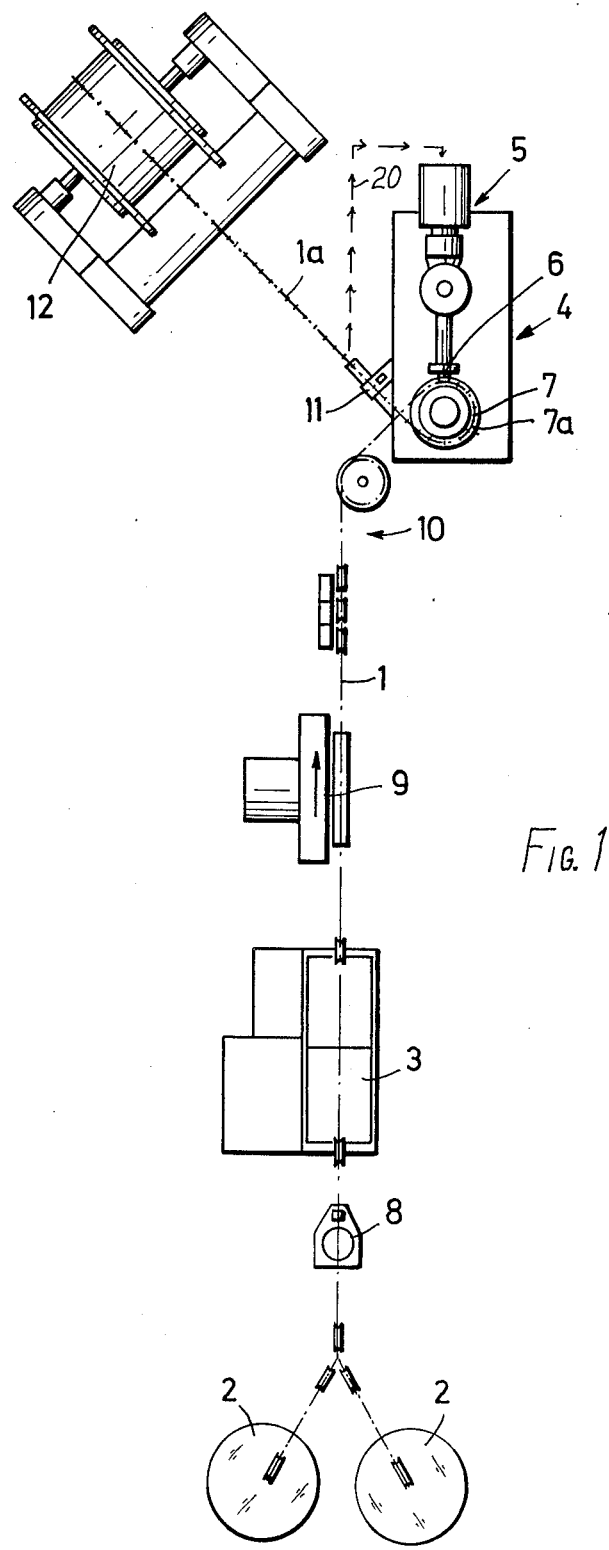
FIG. 1 is a largely diagrammatic view generally illustrating the system for carrying out the method according to this invention.

As shown in FIG. 1 a wire 1 according to this invention is drawn from a pair of overhead supplies 2 which may be spools of wire, drums or any other suitable source. The supplies 2 are set up so that as the one supply runs out the leading end of the wire of the other supply is welded to the trailing end, allowing continuous production. The conductive wire 1 is first passed through a calibrating die 8 then through a solvent bath 3 that removes any foreign matter from the surface of the wire 1. A drum-type tensioning device 9 pulls the wire 1 through the die 8 and path 3.

Thereafter the wire passes through a feeder 10 that directs the wire at a predetermined speed to a molding arrangement 4 comprising an extruder 5 having a nozzle 6 and a mold array 7 having an outer surface 7a.

The extruder 4 with the mold array 7 operates as will be described below to form a wire that is passed through a severing and separating device 11 so as to produce a finished inner conductor 1a for coaxial cable. A spool 12 winds up this conductor 1a which is later employed inside a tubular outer coaxial-cable conductor.

Figure 2:
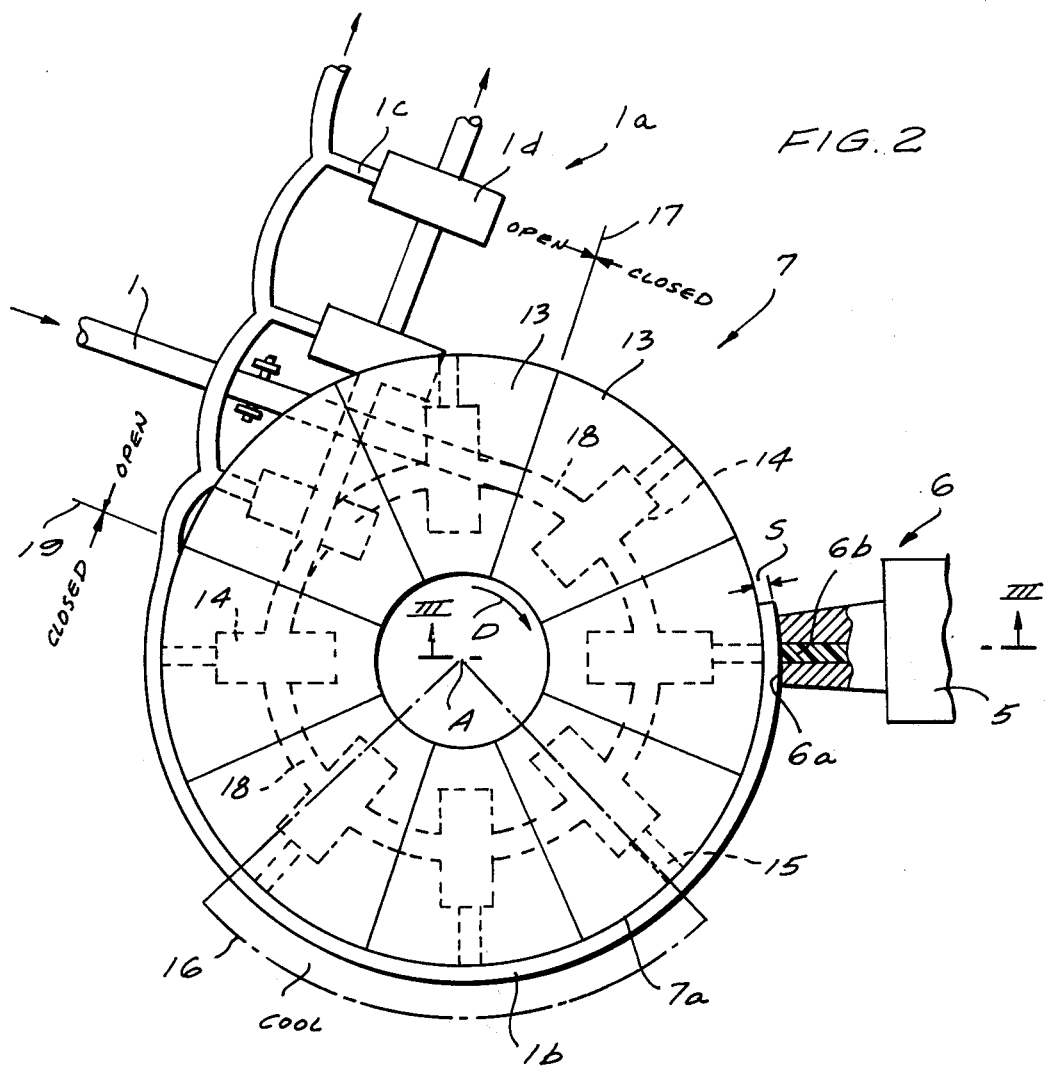
FIG. 2 is a large-scale and partly sectional view of a detail of the apparatus of FIG. 1.
Figure 3:
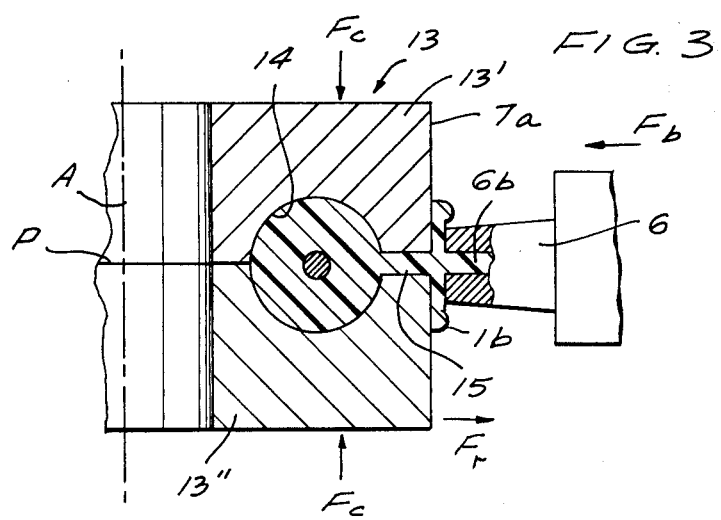
FIG. 3 is a section taken along line III—III of FIG. 2.

FIGS. 2 and 3 show how the mold array 7 is rotatable about an axis A and has a cylindrical outer surface 7a centered on this axis A. This mold array 7 is formed of a plurality, here eight, of pie-shaped mold pairs 13 each formed by an upper mold pair 13' and a lower mold pair 13". Each mold pair 13 is formed with a disk-shaped mold cavity 14 opened to the outside through a small-diameter inlet 15 that opens radially of the axis A. In addition each mold pair 13 forms a circularly arcuate passage 18 of circular cross-section and substantially the same diameter as the circular-section wire 1.

The nozzle 6 of the extruder 5 has a part-cylindrical face 6a of the same radius of curvature as the surface 7a and is formed with an outlet passage 6b opening at this face 6a radially of the axis A and on the same axial level as the sprue orifices or inlets 15. The nozzle or head 6 is biased with a force $F_b$ radially towards the axis A, and the end 6a of the nozzle 6 is spaced by a radial distance s from the surface 7a.

The mold halves 13' and 13" are displaceable toward and away from each other and separate at a plain P perpendicular to the axis A. The entire array 7 is rotated in a direction D about the axis A and means is provided for maintaining the mold halves 13 and 13' closed through an arc of 270° downstream of a point indicated by line 17 and upstream of a point indicated by line 19 in FIG. 2. Similarly downstream of the line 19 and upstream of the line 17 the mold halves 13 and 13' are axially separated. The nozzle 6 is provided approximately 60° downstream relative to the direction D of the closing location 17. Thus since each of the mold pairs 13 is closed when its trailing edge arrives at the line 17 it will be closed through 22.5° before the sprue inlet 15 aligns with the nozzle passage 6b. The mold halves 13' and 13" are forced together when closed with a clamping force $F_c$ that is increased each time a mold pair 13 is radially aligned with the nozzle 6.

The interior of the nozzle 6a is continuously fed synthetic-resin material that therefore always exits from the gap between the surface 6a and the surface 7a.

The wire 1 is fed to the array 7 perpendicular to a plane including the axis A in line 17, so as to lie directly within the passage 18 of the mold pair 13 about to be closed. After closing this mold pair 13 moves with its empty mold cavity 14 into alignment with the nozzle 6 so that material will flow across the space between the end 6a and surface 7a, into the sprue inlet 15, and thereafter into the cavity 14, completely filling this cavity 14 and forming therein a disk 1d and, extending from this disk 1d, a spure 1c. Since the nozzle end 6a and surface 7a are spaced apart. The material exiting from the nozzle 6 will also form a continuous film 1b on the outer surface 7a of the mold array 7. This film 1b will be of a thickness substantially equal to the spacing s and will unitarily unite all of the sprues 1c upstream or ahead of the nozzle 6.

As the sprue inlet 15 moves out of alignment with the passage 6b of the nozzle 6 the extruder will continue to form the film 1b around the outer surface 7a of the mold array 7 and will subsequently fill the next cavity 14 and so on.

As each of the mold pairs moves into the cooling sector 16 the film 1b, sprue 1c, and body 1d will harden. Thereafter when the mold pairs 13 are opened when their trailing edges align with the line 19 it is possible to pull the wire 1 from the array 7, again perpendicular to a plane including the line 19 in axis A. The wire 1 may be fed in and out in the same plane, preferably using a deflecting roller as it is fed in to prevent damage of the exiting wire by the incoming wire.

Thereafter as described above the sprues 1c and film 1b are separated from the bodies 1d. This synthetic-resin scrap is chopped up and fed back into the extruder 5 as shown by arrows 20 in FIG. 1 so that it can be used again.

The spacing s is determined by the difference between the biasing force $F_b$ and the reaction force $F_r$ which is created by the resin exiting from the passage 6b. This reaction force $F_r$ is determined mainly by the viscosity of the resin relative to the desired spacing. The viscosity in turn is determined by the composition of the resin and its temperature.

With the system according to the present invention it is therefore possible to form a succession of bodies find a conductor at a very rapid rate. The apparatus used to do this is relatively simple and can be adjusted for virtually any type of resin or conductor. The formation of the film 1b insures good stripping of the conductor and wire from the mold after production, and therefore greatly decreases potential downtime of the machine.

It will be understood that each of the elements described above, or two or more together, may also fine a useful application in other types of molding systems differing from the types described above.

While the invention has been illustrated and described as embodied in an inner conductor for coaxial cable, it is not intended to be limited to the details shown, since various modifications and structural changes may be made without departing in any way from the spirit of the present invention.

Without further analysis, for foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of molding a succession of discrete bodies on an elongated flexible element using a plurality of mold pairs together forming an array having an outer surface and each having a mold cavity and an inlet between the respective cavity and said surface, said method comprising the steps of:

continuously displacing said array past the end of a generally stationary nozzle and thereby sequentially aligning said inlets with said end;

continuously feeding plastified and hardenable resin material under an adjustable pressure to said end;

maintaining spacing of said nozzle from said surface generally constant by regulating a biasing force urging said nozzle toward said surface during relative displacement of said nozzle and said mold pairs;

so that when said end aligns with an inlet it injects said resin material therethrough into the respective cavity and forms a body therein and a sprue integral therewith in the respective inlet, and so that when said end is not aligned with an inlet said material escapes laterally from between said end and said surface and forms on said surface a continuous film unitary with the previously formed sprues and having a substantially constant thickness;

sequentially closing said mold pairs on successive spaced-apart portions of said flexible element before injection of said material into the respective cavities and sequentially opening said mold pairs after hardening of said material in the respective cavities; and separating said sprues and said film from said bodies after opening of the respective mold pairs.

2. The method defined in claim 1 wherein said material is thermoplastic further comprising the step of replastifying said film and sprues after separation thereof from said bodies and feeding same to said end as a portion of said resin material.

3. The method defined in claim 1, further comprising the steps of biasing the halves forming said mold pairs together with a predetermined force after closing and before opening of same and temporarily increasing said predetermined force during injection of said material into the respective cavities.

4. The method defined in claim 1, further comprising the step of cooling said mold pairs after injection of said material into the respective cavities and prior to opening of said mold pairs.

5. The method defined in claim 1, further comprising the steps of:

withdrawing said flexible element from a supply; passing the withdrawn element through a calibrating die;

cleaning the calibrated element;

feeding the cleaned element at a predetermined speed equal to the displacement speed of said mold cavities to said mold pairs; and withdrawing the cleaned element from said mold cavities at said predetermined speed.

6. The method defined in claim 1, wherein said element is a wire and said resin material is an insulating synthetic resin.

7. The method defined in claim 1, wherein said material exits continuously from between said end and said surface.

8. The method defined in claim 1, wherein said surface is a surface of revolution centered on an axis and said array is displaced by rotation about said axis, said method further comprising the step of feeding said element substantially tangentially to the furthest downstream open mold pair and withdrawing said element carrying said bodies tangentially from the furtherest downstream closed mold pair.

9. The method defined in claim 8, wherein said flexible element passes between two-thirds and seven-eighths of the way around said axis while held in said mold pairs.

10. A method of molding a succession of discrete bodies on an elongated flexible element using a plurality of mold pairs together forming an array having an outer surface and each having a mold cavity and an inlet between the respective cavity and said surface, said method comprising the steps of:

continuously displacing said array past the end of a nozzle and thereby sequentially aligning said inlets with said end;

continuously feeding plastified and hardenable resin material of a predetermined viscosity and at a predetermined temperature at an adjustable feed pressure to said end, whereby said nozzle is urged away from said surface with a reaction force determined by said feed pressure, said viscosity, and said temperature;

maintaining spacing of said nozzle from said surface generally constant by regulating a biasing force urging said nozzle toward said surface during relative displacement of said nozzle and said mold pairs so that when said end aligns with an inlet it injects said resin material therethrough into the respective cavity and forms a body therein and a sprue integral therewith in the respective inlet, and so that when said end is not aligned with an inlet said material escapes laterally from between said end and said surface and forms on said surface a continuous film unitary with the previously formed sprues and having a substantially constant thickness;

sequentially closing said mold pairs on successive spaced-apart portions of said flexible element before injection of said material into the respective cavities and sequentially opening said mold pairs after hardening of said material in the respective cavities; and separating said sprues and said film from said bodies after opening of the respective mold pairs.

* * * * *